March 3, 1953 P. GRABINSKI 2,630,074
CABLE CONNECTOR
Filed April 19, 1948 3 Sheets-Sheet 1
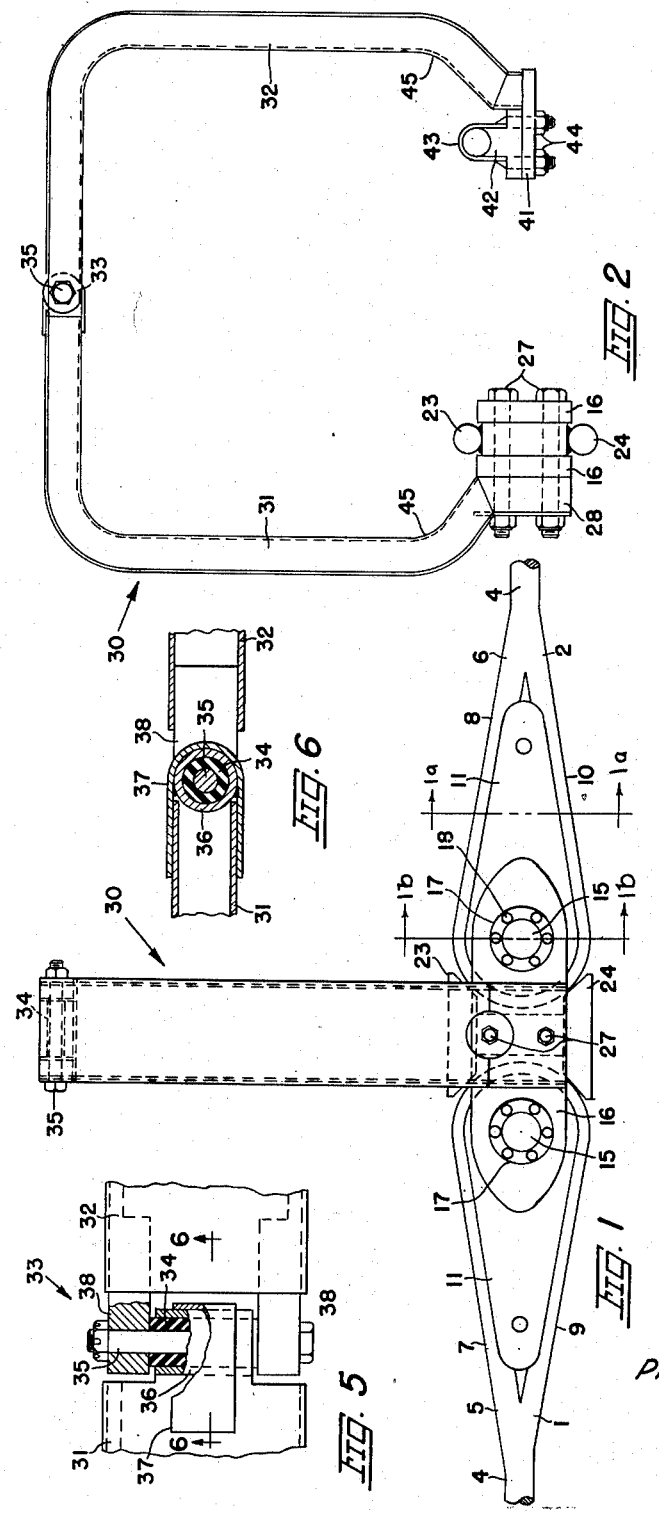
INVENTOR
PHILLIP GRABINSKI
BY
Cook and Schermerhorn
ATTORNEYS March 3, 1953 — P. GRABINSKI — 2,630,074
CABLE CONNECTOR
Filed April 19, 1948 — 3 Sheets-Sheet 2
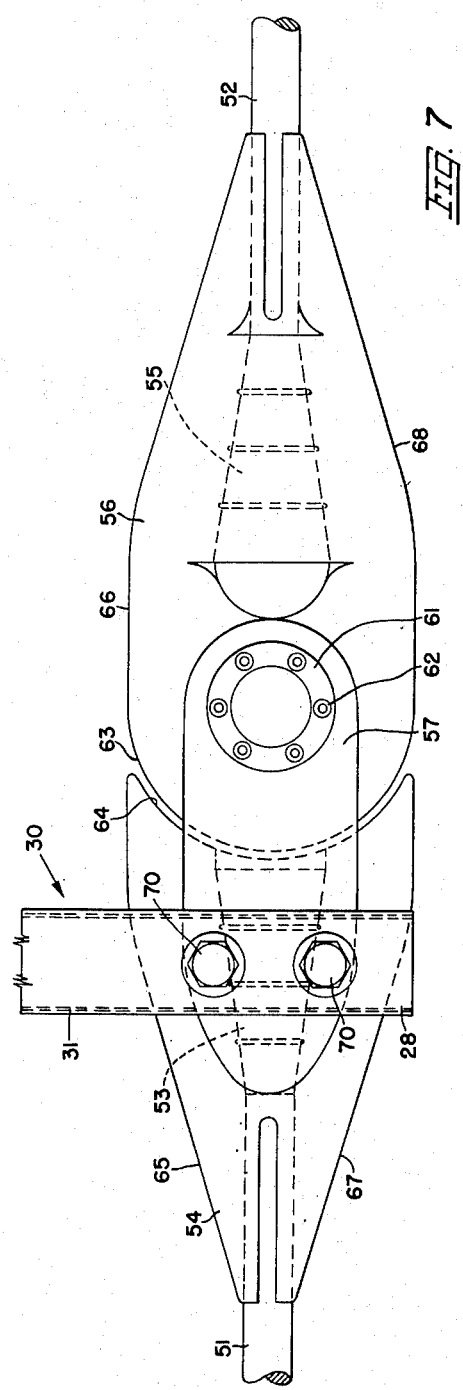
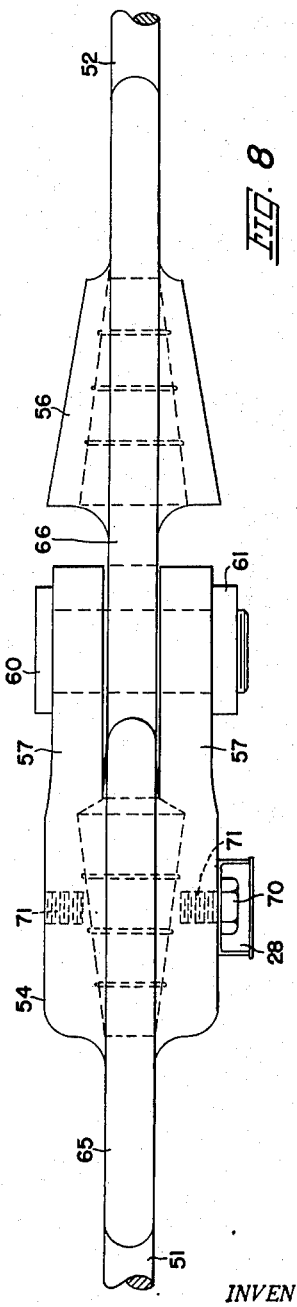
INVENTOR.
PHILLIP GRABINSKI
BY Cook and Schermerh
ATTORNEYS

March 3, 1953  P. GRABINSKI  2,630,074
CABLE CONNECTOR
Filed April 19, 1948  3 Sheets-Sheet 3
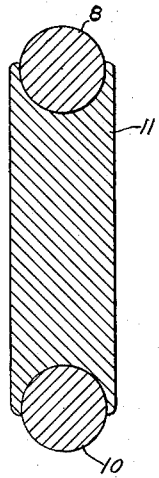
FIG. 1a.
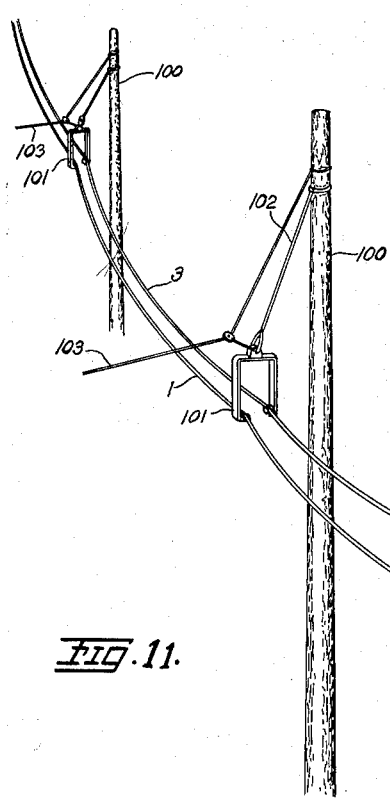
FIG. 11.
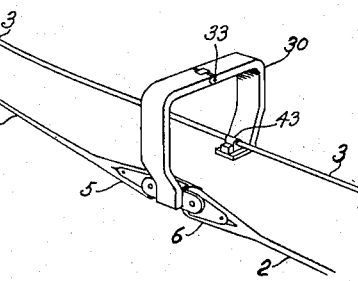
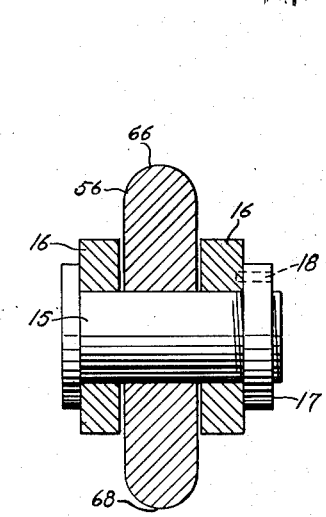
FIG. 10.
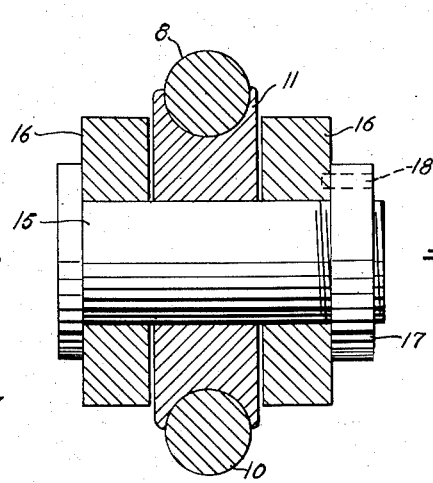
FIG. 1b.
INVENTOR.
Philip Grabinski
BY
Cook and Schermerhorn
ATTORNEYS Patented Mar. 3, 1953

2,630,074

UNITED STATES PATENT OFFICE 2,630,074

CABLE CONNECTOR

Philip Grabinski, Portland, Oreg., assignor of fifty per cent to Robert W. Pointer, Portland, Oreg.

Application April 19, 1948, Serial No. 21,792

16 Claims. (Cl. 104—112)

This invention relates to improvements in cable connectors for connecting the ends of cables, particularly in elevated cableway systems.

The invention has special utility in connecting the ends of cables which are used as supporting cables or tracks in a cableway for traveling vehicles and the like suspended from sheaves which run on the cables. In such cableways the track cables have heretofore usually had their ends anchored in fixed supports such as the towers or poles used to support the cableway, but such practice requires that the positions of the supports be determined by the lengths of the cables or else that portions of the cables be cut off if the end of the cable happens to extend to a point beyond a desirable location for a support. The anchoring of the cable ends in intermediate supports is objectionable for the further reason that the cable connectors are thereby placed on a vertical curve of relatively short radius and fixed position which is productive of high stresses because of the rather abrupt rising and falling of the vehicle sheaves in riding over the support. A heavily loaded vehicle also produces shock or impact loads on the cable and its fittings in passing over any irregularity such as must necessarily be introduced by cable gripping devices designed to take the cable tension. It is desirable to avoid superimposing such impact loads upon acceleration loads and other loads, not only to remain within tensile strength limitations, but also to reduce the localized wear on the cables at the supports.

Some types of cable connectors presently in common use are objectionable on track cables because the thickness, or width, of the connector requires the supporting sheaves for the vehicle to have wide grooves to pass over the connector. Such connectors commonly require the sheaves to have more than twice the groove width necessary to fit the cables, with the result that the sheaves are not properly supported on the cables and cause damage to the cables.

The general object of the present invention, therefore, is to provide a cable connector which may be used in the span between fixed supports so that an entire available length of cable may be used, whereby the supports will not have to be positioned to fit the cable length or the cable cut off to fit the span length. Other objects are to provide a cable connector for use at any intermediate point in the span, which will maintain the continuity of the track for the use of cableway vehicles and the like, to provide a cable connector for making a joint in only one of a pair of parallel cables, to provide novel means for holding a cable track connector in an upright position in mid span, to provide a reversible connector having track surfaces on opposite sides thereof to double the useful life of the connector and cables, and to provide a connector having track surfaces for sheaves which are grooved to fit the cables.

The invention comprises cooperating connector parts which may take different forms to join together the ends of two cables and maintain the continuity of the track over the joint for sheaves which are grooved to fit the cables. Since two cables cannot be securely gripped and brought together in end to end relation to maintain a continuous track through the joint on the cables themselves, some form of fixture must be provided for securing the ends of the two cables to sustain the tension and for bridging any gap between the upper surfaces of the cables where such surfaces must depart from the track level in order to be effectively anchored. In one form of the invention, eye splices are formed in the ends of the cable to receive suitable thimbles having pin and plate connectors to sustain the cable tension. The connector includes a short spacer having a rail to bridge the necessary gap between the two cable eyes and maintain a track surface in line with the cable track. One leg of an inverted U-shaped frame is attached to the connector assembly and the other leg of the frame is attached to another cable of the cableway to hold the eye splices and connector parts in vertical position so that the supporting sheaves using the cableway will roll on the edges of the two eye splices.

In another form of the invention the two cable ends without splices are anchored directly in the line of tension in special socket fittings. Since such fittings must completely surround the cable to obtain a secure grip thereon, suitable means having approximately the same width as the cable must be provided to form a track over the ends of the cable which will fit and guide the supporting sheaves of the traveling vehicle. To meet these requirements the connector parts are flattened in a vertical plane and are attached in such position to one leg of an inverted U-shaped frame which is prevented from twisting by having its other leg attached to another cable of the cableway as in the first mentioned embodiment. The tension in the cable is sustained by a pin connector between the parts which anchor the respective cable ends, or by other suitable means. Thus, with either form of the invention, the connector may be applied at the end of a supporting cable or cable track without regard to the positions of the fixed supports for the cableway. In a cableway having two parallel cables it is not necessary for both cables to end at the same point, because the U-shaped frame of the connector does not have to attach to a similar connector on the other cable. The connector parts in all embodiments are reversible to turn the bottom sides of the connectors and cables uppermost after wear has occurred.

The invention will be better understood and additional objects and advantages will be apparent from the following description of certain specific embodiments of the invention with reference to the accompanying drawings, but it is to be understood that the invention is capable of still other changes in the construction and arrangement of parts and that all such modifications within the scope of the appended claims are included in the invention.

In the drawings:

Figure 1 is a side elevation view of one form of connector assembly embodying the principles of the invention;

Figure 1a is a sectional view of the thimble, taken approximately on the line 1a—1a of Figure 1;

Figure 1b is a sectional view taken on the line 1b—1b of Figure 1;

Figure 2 is an end elevation view of the assembly shown in Figure 1 with certain parts removed;

Figure 3 is a side elevation view of the spacer shown in Figures 1 and 2;

Figure 4 is an end elevation view of the spacer;

Figure 5 is a fragmentary enlarged top plan view of the hinge joint in the U-shaped frame, with certain parts broken away;

Figure 6 is a sectional view taken on the line 6—6 of Figure 5;

Figure 7 is a side elevation view of a modified form of connector assembly;

Figure 8 is a top plan view of the connector shown in Figure 7; and

Figure 9 is a side elevation view of another modification;

Figure 10 is a sectional view, taken on the line 10—10 of Figure 9;

Figure 11 is a perspective view showing the connector of Figure 1 applied at an intermediate point in a span of a cable track system.

As shown in Figures 1, 2 and 11, one embodiment of the connector is used to connect the ends of two cables 1 and 2 at an intermediate point in a span between supports so that the cables 1 and 2 will form one track of a cable track system having another cable 3 strung equidistant from the cables 1 and 2 to form a parallel track. This parallel cable arrangement is used to support a cableway vehicle having certain sheaves on one side running on the cables 1 and 2 and other sheaves on the other side running on the cable 3. There is no joint or break in the cable 3 opposite the connection between the cables 1 and 2, the nearest joint at an end of the cable 3 being at a different place in the span or in a different span, but it is within the scope of the invention to have both of cables 1 and 3 end at the same place.

Figure 11 illustrates a cableway installation wherein the supporting towers comprise poles or standing spar trees 100. At each such pole a cable track jack 101 is suspended by a cable 102 which is pulled away from the pole by means of a lateral guy 103. In the several spans of the cableway illustrated in Figure 11, the cables 1 and 3 extend continuously through the jacks 101, and no cable splices are made at these jacks. The cable 1 is seen to end at an intermediate point in the span shown in the foreground, and the present connector is employed at this point to connect the end of the cable 1 with the cable 2 in a novel manner to maintain a continuous cable track across the joint. The next pole may be at a considerable distance from the end of cable 1, and is equipped with a jack 101 to support the cables 2 and 3 in the same manner that the cables 1 and 3 are supported at the poles shown.

For use with this embodiment of the invention, the adjoining ends of the cables 1 and 2 are provided with eye splices 4 forming cable eyes 5 and 6 which must be maintained in vertical positions so that the top edges 7 and 8 of the eyes will form track surfaces in continuation of the respective cables. The bottom edges of the respective cable eyes are designated by the numerals 9 and 10. The splices 4 are long splices to avoid unduly thickening the cables. Thimbles 11 are placed in the cable eyes to hold the eyes in alignment in a common plane, to support the cable in the bend of the eye in a sufficient large radius of curvature to avoid undue stress on the cable and to support the upper track portions 7 and 8 of the eyes above the other parts of the connector.

The thimbles 11 are loosely mounted on pins 15 extending between a pair of laterally spaced side plates 16. The numeral 17 designates circular nuts on the ends of the pins 15, which nuts are locked to the side plates 16 by a lock bolt or screw 18 which is inserted in one of a series of holes in the nut and secured in a threaded hole in the adjacent plate 16.

A spacer 20, as shown in Figures 3 and 4, is secured between the side plates 16 and between the two cable eyes. The spacer 20 comprises a plate 21 having slightly greater thickness than the thimbles 11 and provided with a pair of bolt holes 22. Short cylindrical rails 23 and 24 are welded at 25 to the top and bottom sides of the plate 21, as shown, to make tracks in the gap between the cable eyes on opposite sides of the connector. The rails 23 and 24 have the same diameter as the cables 1 and 2 and their ends are beveled at 26 to approach closely to the sheave supporting surfaces of the cables so that sheaves rolling on the cables will not encounter an appreciable bump in passing over the connector. A pair of bolts 27 are received in the holes 22 and in similar holes in the side plates 16 to secure the spacer 20 between the side plates, and to attach to the connector a lower vertical end portion 28 of an inverted U-shaped frame 30. In Figure 2 the thimbles and cables are removed.

The frame 30 comprises two legs 31 and 32 of hollow box construction interconnected by a hinged joint 33 including a resilient bushing 34 on a bolt 35 as shown in Figures 5 and 6. The bushing 34 which may be of rubber is preferably compressed or squeezed into a cylindrical tube 36 which is mounted on the upper end of the leg 31 of the frame. The numeral 37 designates a strap passing around the tube 36 and welded to the top and bottom plates on the opposite sides of the box frame of the leg. The bolt 35 is received within the bushing 34 and has its ends mounted in a pair of arms 38 which constitute extensions of the side flanges or plates of the hollow box construction of the leg 32. The tube 36 is preferably slightly shorter than the clear space between the two arms 38, and the ends of the bushing 34 extend out of the tubes to abut the arms 38 and prevent metal to metal contact between the parts. The bushing 34 snugly engages the various parts with which it is associated to permit relative pivotal movement of the legs 31 and 32 of the frame without allowing the joint of the frame to become loose or to rattle.

A clamp block 41 having a cable saddle 42 is integrally mounted on the lower end of the leg 32 so that a cable clamp 43 equipped with tightening nuts 44 may be applied thereto in an obvious manner to clamp the cable 3. The clamp 43 is relatively thin where it passes over the cable so as to offer no obstruction to sheaves rolling on the top side of the cable. Both legs 31 and 32 of the U-frame are curved outwardly at 45 to clear the sheaves and axles traveling on the cableway so that the sheaves will readily pass through the frame 30. The frame 30 is, of course, open at the bottom between the cables to allow for passage of the hangers and other parts of the suspended vehicles disposed between the cables.

The hinged joint 33 between the two legs 31 and 32 of the U-shaped frame allows the two cables to move together or apart to adjust themselves to the spacing of the supporting sheaves of the vehicle. However, since the joint 33 is at a considerable distance from the cables, it does not allow the cable eyes 5 and 6 to twist to any appreciable extent out of a vertical position as long as the parallel cables remain in the approximate spacing shown in Figure 2. In this way the frame 30, supported on one side by the connector and on the other side by the cable 3, is effective to hold the eye splices in a vertical position so that as shown in Figure 1 the top edges 7 and 8 thereof, together with the top rail 23, will form a substantially continuous and straight track surface over which the rolling sheaves may easily pass without contacting the side plates 16.

By reason of the symmetrical construction of the connector, when the top sides 7 and 8 of the two cable eyes and the top rail 23 have become worn, the bolts 27 may be removed and the cables 1 and 2, together with the connector, rotated through 180 degrees. Then the bolts 27 are replaced with the other sides 9 and 10 of the cable eyes and the other rail 24 in a position for use. The life of the cables and joint is thereby doubled with but a small effort and without disconnecting the cables or replacing any of the parts.

In Figures 7 and 8 the principles of the invention are applied to a socket type connector. The cables 51 and 52, when connected together, constitute one of the two parallel cables of an overhead cable track, as described in connection with Figures 1 and 2. It is to be understood, therefore, that the cables 51 and 52 are strung in parallel relation with another cable 3, and that the other leg of the U-shaped frame 30 in Figures 5 and 6 is attached to the cable 3, as shown in Figure 2.

The end of the cable 51 is secured in a conventional manner in a socket 53 in a connector member 54, and the end of the cable 52 is similarly secured in a socket 55 in a cooperating member 56. The member 54 constitutes a female connector provided with two spaced arms 57 to receive the male member 56 therebetween on a pin or bolt 60. The numeral 61 designates a circular nut on the bolt 60 having a series of spaced holes to receive a bolt or cap screw 62 to lock the nut to one of the arms 57.

The end of the member 56 is curved at 63 on a circular arc concentric with the axis of the bolt 60, and the adjacent end of the member 54 between the arms 57 is similarly curved but to a slightly greater radius to leave a small clearance between the parts for pivotal action on the bolt 60. The member 54 is provided on its top side with a sloping rounded edge 65 of the same width as the cable 51, and the member 56 is provided with a similar edge 66 in alignment with the edges 65 to form track rails for a sheave traveling over the joint. Thus, as each sheave passes over the joint, it is supported and guided by the rail portions 65 and 66 which fit the sheave the same as the cables. The flanges of the sheave do not come in contact with the arms 57 or the thickened portions of the parts around the sockets 53 and 55. The members are symmetrical on top and bottom, having oppositely disposed sloping edges 67 and 68 forming rails in a similar manner on the bottom side of the connector. The connector is maintained in a vertical plane by a pair of cap screws 70 received in tapped holes 71 in the member 54, whereby the connector is secured to the lower vertical portion 28 of the arm 31 of the frame or yoke 30. Tapped holes 71 are also provided in the opposite side of the member 54 so that the connector may be turned over to bring the bottom side uppermost to distribute the wear on the cable and connector parts.

The connector and frame 30 are entirely independent of any fixed support, being attached only to the cables as in the first embodiment.

Figure 9 shows a modification which combines certain features of both the foregoing embodiments. The cable 52 is socketed in a male connector fitting 56 of the type shown in Figures 7 and 8. In this case, the other cable 51 is also socketed in a male connector fitting 56, whereby all the cable ends have identical fittings making it unnecessary to dispose the cables to mate male and female connector fittings. The two male fittings 56 are pivotally interconnected by pins 15 extending between side plates 16 arranged in the manner previously described in connection with Figures 1 to 4. A spacer 20 carrying rail sections 23 and 24 is disposed between the side plates 16, and the whole assembly is attached by bolts 27 to the arm 31 of a U-frame member 30, as shown. The cables and connector parts may be turned over to wear on the opposite sides without separating the cables by merely temporarily removing the bolts 27 to turn the rail 24 and track surfaces 68 uppermost and then reinserting the bolts 27. It is apparent that this modification accomplishes the objects and advantages of the invention in substantially the same manner as the previous embodiments by merely employing socketed connectors in place of the eye splice thimbles in the assembly of Figure 1.

In operation, the action and behavior of a cableway vehicle in passing over the present connector in any of its various forms is quite different from the action on connectors which are mounted to serve also as a support for the cable. The weight of a vehicle carrying a load causes the cable to sag considerably between supports, imparting an increasingly greater slope to the cable as the vehicle approaches more closely to the support. As the vehicle sheaves arrive at the support, they ascend on a relatively steep incline, but as the sheaves pass over the support they must immediately begin to descend on the other side in an equally steep decline. The leading sheaves of the vehicle are thus descending while the other sheaves are still rising. On intermediate supports where there are no connector fittings, the abrupt change in gradient of the cable is negotiated rather smoothly and without severe wear on the cable at moderate speeds. However, when connectors are incorporated in the supports in the conventional manner, there must necessarily be slight interruptions or other irregularities in the continuity of the track surface in addition to the change in slope on opposite sides of the support which cause at least slight bumping of the sheaves in passing over the solidly supported connector. These irregularities impose a serious limitation on the speed of load carrying vehicles because under heavy loads a relatively insignificant bump against a solid support is magnified at higher speeds into a severe pounding action which not only wears out the cable and connector parts but also constitutes a hazard to the safe passage of the vehicle.

When the connector is disposed in the span of the cable according to the present invention, rather than at a point of support, these bumps are not severe because the cable and connector parts are free and flexible to adjust themselves to make a more ideal track surface. Before the vehicle arrives at the connector the line of tension through the cables passes through the center of the connector, causing the uppermost track portions across the connector to be elevated above this line of tension which would appear to produce a bump in the track. However, since the present connector is not attached to a fixed support, it is free to be depressed by the vehicle sheaves so that they will not be lifted abruptly in passing thereover. Any irregularities in the track surface across the connector do not cause the vehicle sheaves to pound on the connector against a fixed support. The unavoidable impacts against the connector are absorbed by the resilience of the cable throughout the span length. With respect to the vehicle, the connector behaves in the same manner as the rest of the cable in the span. The present construction thereby separates the problem of connecting the cables from the problem of supporting the cables, whereby a more satisfactory connection is made because the connector does not form part of a solid support in a fixed vertical curve. Also, the life of the cable is lengthened because the supporting sheaves on the vehicle can be grooved to fit the cable properly for smooth operation.

Having now described my invention and in what manner the same may be used, what I claim as new and desire to protect by Letters Patent is:

1. A cable connector for use in an elevated cableway system, comprising cooperating parts for connecting the ends of two cables together at an intermediate point in a span of said cableway, a substantially continuous track surface across the length of said connector, and an arm on said connector having a clamp for engaging another adjacent parallel cable to hold said connector in a fixed rotative position relative to the axis of the connected cables with said track surface uppermost.

2. In a dual cable track having a pair of parallel cables, a connector for a joint in one of said cables at an intermediate point in a span of the cables, a track surface on said connector across said joint, a rigid arm extending from said connector, and a clamp on the other cable connected with said arm to prevent twisting of the one cable and hold said track surface in an upwardly facing position.

3. In a dual cable track having a pair of parallel cables, a connector for a joint in one of said cables at an intermediate point in a span of the cables, a track surface on said connector across said joint, a rigid arm extending upwardly from the side of said connector remote from the other cable, said arm having an upper portion extending toward said other cable, and a clamp on said other cable connected with said arm.

4. In a cable connector, means for connecting two cables end to end to form a joint at an intermediate point in a span of the cables, a track surface on said connector across said joint, a rigid lateral arm on said connector, a cable clamp disposed laterally from said connector, and a rigid support for said clamp connected with said arm.

5. In a cable connector, means for connecting two horizontal cables end to end to form a joint at an intermediate point in a span of the cables, a track surface on said connector across said joint, a rigid arm extending laterally from one side of the connector and above and across the connector, a cable clamp disposed on the opposite side of said connector, and a rigid support for said clamp connected with said arm.

6. A connector assembly for a dual cable track comprising connector parts for connecting the ends of two cables together at an intermediate point in a span of said cable track, a substantially continuous track surface across said connector, a U-shaped frame having one end attached to said connector and the other end attached to the opposite cable of said dual cable track, a hinge joint in said frame to accommodate variation in the lateral spacing of said cables, and a resilient bushing in said joint.

7. A cable connector assembly comprising connector parts for connecting the ends of two cables in a cableway span remote from a support, track surfaces on top and bottom sides of said parts to maintain a substantially continuous track across said connector assembly, and an arm on said connector having a clamp for engaging an adjacent parallel cable to hold said connector assembly against rotation on the cable axis with either one of said track surfaces in uppermost position to support and guide a sheave across said connector assembly.

8. In a cable connector, means for connecting two horizontal cables end to end to form a joint at an intermediate point in a span of the cables, longitudinal track surfaces on top and bottom sides of said connector aligned with the connected cables, an offset upright arm on one side of said connector having an upper portion extending across the connector to the opposite side of the connector, a cable clamp disposed on said opposite side of the connector, and a rigid support for said clamp connected with said arm.

9. A connector assembly for an intermediate point in a span of a cableway comprising a cable eye connector adapted to hold the eyes in two connected cables in a common plane with the edges of said eyes forming track surfaces in continuation of said cables, an arm extending from said connector, and a clamp on said arm to engage another adjacent parallel cable of said cableway and hold the plane of said eyes in a vertical position.

10. A cable track connector comprising a pair of cable eye thimbles arranged to hold a pair of cable eyes at an intermediate point in a cable span in a common plane with the edges of said eyes forming track surfaces on opposite sides of said connector, and rail sections on opposite sides of said connector extending between said edges so that said connector and track cables may be turned over to wear on opposite sides thereof.

11. A connector assembly for a cableway comprising a socket connector for joining together the ends of two cables, said connector being supported by said cables at an intermediate point in a span of the cableway, a track surface extending the length of said connector, an arm extending from said connector, and a clamp on said arm to engage another adjacent parallel cable of said cableway to hold said connector in a rotative position with said track surface on the top side thereof.

12. A cable track connector comprising a pair of pin connected socket members secured to the ends of track cables at an intermediate point in a span of the cables, and track surfaces extending the length of said connector on opposite sides thereof so that said connector and track cables may be turned over to wear on their opposite sides.

13. A mid span cable track connector comprising a pair of pin connected socket members secured to the ends of track cables, and track surfaces having the same width as said cables extending the length of said connector on opposite sides thereof.

14. A cable track connector comprising a pair of identical pin and link connected socket members secured to the ends of track cables at an intermediate point in the span of the cables, and track surfaces having the same width as said cables extending the length of said connector on two opposite sides thereof.

15. A cable track connector comprising a pair of identical connector members for adjacent ends of track cables, pin and link connector means for uniting said members at an intermediate point in the span of the cables, a track surface on said connector having the same width as said cables, an arm on said link having a portion extending laterally and horizontally from the link, and a clamp on said arm to engage another cable adjacent and parallel with the connected cables and hold said track surface portion of the connector uppermost.

16. A cable track connector assembly comprising connector members for joining the ends of two cables at an intermediate point in the span of the cables, track surfaces on two opposite sides of said connector assembly having the same width as the cables, a frame member having a clamp for attachment to another adjacent parallel cable, and means for attaching said connector assembly to said frame member in two different positions to place either one of said track surfaces uppermost without disconnecting said cable ends from the connector assembly.

PHILIP GRABINSKI.

REFERENCES CITED

The following references are of record in the file of this patent:

UNITED STATES PATENTS

| Number | Name | Date |
| --- | --- | --- |
| 343,319 | Jenkin | June 8, 1886 |
| 1,419,684 | Neller | June 13, 1922 |
| 1,941,964 | Zapf | Jan. 2, 1934 |
| 2,349,263 | Grabinski | May 23, 1944 |

FOREIGN PATENTS

| Number | Country | Date |
| --- | --- | --- |
| 248,790 | Germany | July 1, 1912 |